(12) United States Patent
Sponholz, III

(10) Patent No.: US 10,470,456 B2
(45) Date of Patent: Nov. 12, 2019

(54) METHOD, APPARATUS, AND SYSTEM FOR AUTOMATED AUDITORY LURING OF ANIMALS

(71) Applicant: Fredric C. Sponholz, III, Houston, TX (US)

(72) Inventor: Fredric C. Sponholz, III, Houston, TX (US)

( * ) Notice: Subject to any disclaimer, the term of this patent is extended or adjusted under 35 U.S.C. 154(b) by 293 days.

(21) Appl. No.: 15/449,484

(22) Filed: Mar. 3, 2017

(65) Prior Publication Data

US 2018/0249701 A1   Sep. 6, 2018

(51) Int. Cl.
  *A01M 31/06* (2006.01)
  *A01M 31/00* (2006.01)
  *A01M 23/00* (2006.01)

(52) U.S. Cl.
  CPC .......... *A01M 31/004* (2013.01); *A01M 23/00* (2013.01); *A01M 31/002* (2013.01); *A01M 31/06* (2013.01)

(58) Field of Classification Search
  CPC .. A01M 31/004; A01M 23/00; A01M 31/002; A01M 31/06
  See application file for complete search history.

(56) References Cited

U.S. PATENT DOCUMENTS

| | | | | |
|---|---|---|---|---|
| 5,964,054 A * | 10/1999 | Galfidi, Jr. | ............... | G10K 9/04 42/90 |
| 10,194,652 B1 * | 2/2019 | Bloomquist | .......... | A01M 31/06 |
| 2003/0093169 A1 * | 5/2003 | Gardner | ............... | A01M 31/004 700/94 |
| 2004/0223625 A1 * | 11/2004 | Stilwell | .................. | A01K 15/02 381/124 |
| 2005/0094825 A1 * | 5/2005 | Loness | ................ | A01M 31/002 381/82 |
| 2006/0031074 A1 * | 2/2006 | Gasque | ............... | A01M 31/002 704/276 |
| 2007/0222623 A1 * | 9/2007 | Wiliams | ................. | A01K 15/02 340/573.2 |
| 2008/0151055 A1 * | 6/2008 | Elsemore | ............ | A01M 31/002 348/155 |
| 2008/0159079 A1 * | 7/2008 | Dir | ........................ | A01K 97/125 367/139 |
| 2008/0171574 A1 * | 7/2008 | Sceery | ................... | G06Q 40/00 455/557 |
| 2008/0228498 A1 * | 9/2008 | Gasque | ............... | A01M 31/002 704/276 |
| 2015/0096500 A1 * | 4/2015 | McCain | .............. | A01M 31/004 119/719 |
| 2016/0324140 A1 * | 11/2016 | Gregorich | ........... | A01M 31/004 |
| 2019/0037830 A1 * | 2/2019 | Cagle | .................. | A01M 31/004 |

* cited by examiner

*Primary Examiner* — Christopher P Ellis
(74) *Attorney, Agent, or Firm* — Williams Morgan, P.C.

(57) ABSTRACT

I disclose an apparatus, comprising at least one sensor configured to receive at least one signal indicative of a proximity of a first animal, at least one environmental signal, or both; a processor configured to detect a sufficient proximity of the first animal, a favorable environmental condition, or both from the received signal or signals, and emit a triggering signal in response to the detection; and an audio playback device configured to receive the triggering signal and emit a call of a second animal in response to the triggering signal. I also disclose a system comprising the apparatus and a trap; and a method of luring an animal.

20 Claims, 7 Drawing Sheets

METHOD, APPARATUS, AND SYSTEM FOR AUTOMATED AUDITORY LURING OF ANIMALS

BACKGROUND OF THE INVENTION

Field of the Invention

Generally, the present disclosure relates to the field of animal lures, particularly animal lures emitting an auditory signal.

Description of the Related Art

Ranchers in North America, South America, Australia, and other locations may suffer loss of livestock, such as cattle, sheep, or goats, among others, to predatory animals, such as coyote, bobcat, mountain lion, fox, wolf, wild dog, dingo, or jaguar, among others.

Attempts to control predatory animals include hunting. However, hunting is an active control mechanism, in which one or more ranch personnel must be actively engaged. A passive control mechanism, such as the use of traps, is desirable in that it frees up ranch personnel to engage in other productive operations.

Traps, however, have a shortcoming, in that a predatory animal must be lured into the trap.

The use of food baits for traps are well known in the art. Generally, a food found palatable by the predatory animal is placed in a trap, in the expectation that the predatory animal will smell or otherwise sense the food bait, be lured to the trap, enter the trap, and be entrapped thereby.

However, food baits are often removed by small animals, removed or consumed by insects, and/or spoiled by microorganisms. Also, other animals may sense the food bait, enter the trap, and inadvertently be entrapped. The need to replace removed or spoiled food bait and remove or dispose of inadvertently entrapped animals represents a maintenance cost and undesirable consumption of ranch personnel time.

Therefore, it would be desirable to lure predatory animals to a trap without the need for food bait.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present disclosure is directed to an apparatus, comprising at least one sensor configured to receive at least one signal indicative of a proximity of a first animal, at least one environmental signal, or both; a processor configured to detect a sufficient proximity of the first animal, a favorable environmental condition, or both from the received signal or signals, and emit a triggering signal in response to the detection; and an audio playback device configured to receive the triggering signal and emit a call of a second animal in response to the triggering signal. The present disclosure is also directed to a system comprising the apparatus and a trap; and a method of luring an animal.

The present disclosure may address and/or at least reduce one or more of the problems identified above regarding the prior art and/or provide one or more of the desirable features listed above. For example, the apparatus, system, and method may lure predatory animals to a trap without the need for food bait.

BRIEF DESCRIPTION OF THE DRAWINGS

The disclosure may be understood by reference to the following description taken in conjunction with the accompanying drawings, in which like reference numerals identify like elements, and in which.

Figure 1:
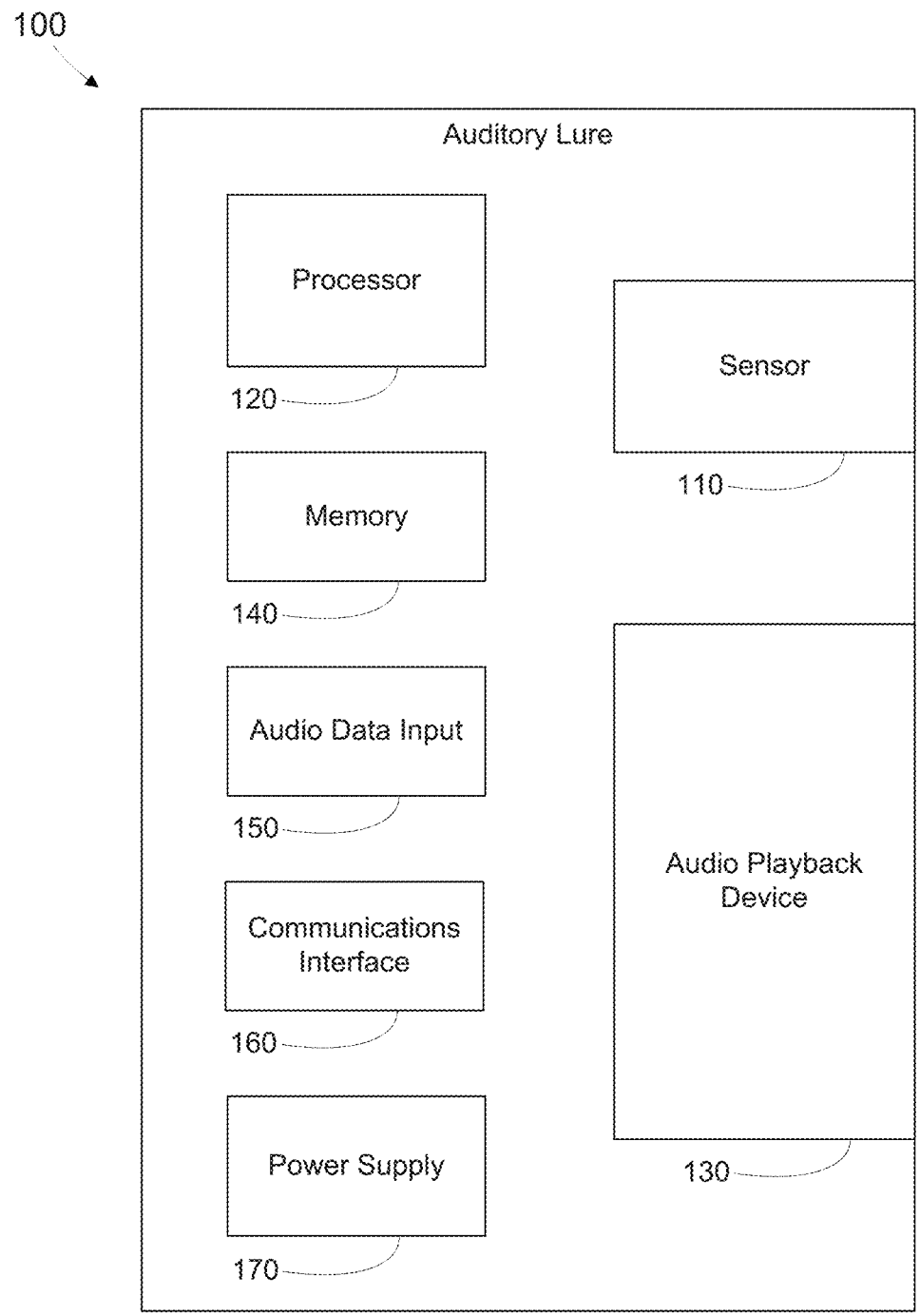
FIG. 1 depicts, in block schematic form, an auditory lure in accordance with at least one embodiment of the present disclosure.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Regarding particular phrases used herein, a "first animal" is an individual of a first animal species, and a "second animal" is an individual of a second animal species different from the first animal species.

Embodiments herein provide for an auditory lure and a system comprising the auditory lure and a trap, whereby the trap may be effective in entrapping a first animal without the need for food bait.

Turning to FIG. 1, in one embodiment, the present disclosure relates to an auditory lure 100. As depicted, the auditory lure 100 may comprise at least one sensor 110 configured to receive at least one signal indicative of a first animal, at least one environmental signal, or both.

Generally, any sensor known in the art may be used in the auditory lure 100. The person of ordinary skill in the art having the benefit of the present disclosure will be aware of various sensors suitable for use in auditory lure 100. Desirably, the sensor 110 may be ruggedized against extremes of heat, cold, dry weather, and wet weather as may prevail in an outdoor environment where the auditory lure 100 may be deployed. Alternatively or in addition, the sensor 110 may have a low power consumption, which may be desirable in embodiments wherein the power supply 170 comprises batteries.

In one embodiment, the at least one sensor 110 may be selected from a passive infrared sensor, an infrared sensor, an ultrasonic sensor, a laser, a sound-activated sensor, an ambient light sensor, or a timer. By way of example, a passive infrared sensor or an infrared sensor may receive an infrared signal indicative of the first animal's body heat and/or motion.

For another example, an ultrasonic sensor may receive an ultrasound signal indicative of the first animal's motion. For another example, a laser may receive a reflected light signal indicative of the first animal's motion, or a laser may be paired with a remote light detector (not shown) communicating with the main body of auditory lure 100, whereby interruption of a laser beam emitted by the laser and detected by the remote light detector may be received by the system as a signal indicative of the first animal's motion.

By way of another example, a sound-activated sensor may receive a signal indicative of a vocalization of the first animal.

For another example, an ambient light sensor (e.g., a light dependent resistor combined with a comparator) may receive a signal indicative of a time of day and/or weather conditions (e.g., cloudless day, cloudy day, sunset, evening twilight, night, morning twilight, or sunrise), such as a time of day at which the first animal is known to be active. A similar effect may be achieved by a timer or clock, optionally in combination with a look-up table stored in memory 140 or a request from a remote server (not shown) via communications interface 160 of day/sunset/evening twilight/night/morning twilight/sunrise times at the location and day(s) of the year at which the auditory lure 100 is deployed.

As should be apparent, although only one sensor 110 is depicted in FIG. 1, by the phrase "at least one sensor 110" a plurality of sensors 110 are contemplated, in one or more embodiments in accordance with the present disclosure.

The first animal may be any animal for which entrapment is desired. For example, ranchers may desire the entrapment of predator species known to attack livestock species in North America, South America, or Australia, among other locations. Examples of the first animal include, but are not limited to, coyote, bobcat, mountain lion, fox, wolf, wild dog, dingo, or jaguar, among others.

The auditory lure 100 may also comprise a processor 120. The processor 120 may be any electronic device, such as an integrated circuit device, e.g. a microprocessor, a system on a chip device, or a microcontroller, among others. The person of ordinary skill in the art having the benefit of the present disclosure will be aware of various such devices suitable for use in auditory lure 100.

Desirably, the processor 120 may be ruggedized against extremes of heat, cold, dry weather, and wet weather as may prevail in an outdoor environment where the auditory lure 100 may be deployed. Alternatively or in addition, the processor 120 may have a low power consumption, which may be desirable in embodiments wherein the power supply 170 comprises batteries.

The processor 120 may be configured to detect a sufficient proximity of the first animal, a favorable environmental condition, or both from the received signal or signals. By a "sufficient proximity" is meant that, in view of one or more known characteristics of the first animal for which luring and/or trapping is desired, the first animal is close enough to the auditory lure 100 to be reasonably expected to hear a call emitted by audio playback device 130 and respond thereto. By a "favorable environmental condition" is meant that, again in view of one or more known characteristics of the first animal for which luring and/or trapping is desired (e.g., environmental conditions in which it is more active, e.g., a time of day at which it is more active), that if a first animal is active in the vicinity of the auditory lure 100, it would be reasonably expected to hear a call emitted by audio playback device 130 and respond thereto.

As such, the processor 120 may require programming with characteristics of the first animal prior to deployment of auditory lure 100 that may be detected from signals received from sensor 110. For example, the processor 120 may be programmed during manufacturing with characteristics of one or more first animals, and the auditory lure 100 may comprise a first animal selection input (not shown), such as a slider switch, forward/back/select buttons to cycle through a list and select a first animal therefrom, an alphanumeric keypad, or the like, with an appropriate feedback device, such as words or icons next to slider switch positions, an LCD display showing list elements or alphanumeric input, or the like, such as will be apparent to the person of ordinary skill in the art having the benefit of the present disclosure. For another example, the processor 120 may be programmed by the user before or after deployment thereof, such as by way of a smartphone app or computer program, in which the user may select a desired first animal and, in response, the first animal's characteristics will be downloaded from a remote server (not shown) to the user's smartphone or computer, and thence transferred from the smartphone or computer to auditory lure 100 via communications interface 160. Programming the processor 120 may be performed by the person of ordinary skill in the art having the benefit of the present disclosure.

The processor 120 may further be configured to emit a triggering signal in response to the detection. Generally, the processor 120 may output the triggering signal therefrom to the audio playback device 130.

The auditory lure 100 may comprise an audio playback device 130. Any device capable of emitting an auditory signal into the environment may be used. Desirably, the auditory playback device 130 may be ruggedized against extremes of heat, cold, dry weather, and wet weather as may prevail in an outdoor environment where the auditory lure 100 may be deployed. Alternatively or in addition, the auditory playback device 130 may have a low power consumption, which may be desirable in embodiments wherein the power supply 170 comprises batteries.

The audio playback device 130 may be configured to receive the triggering signal. The audio playback device 130 may also be configured to emit a call of a second animal in response to the triggering signal.

In one embodiment, the second animal is a prey species upon which the first animal is a predator. Examples of the second animal include, but are not limited to, livestock species, such as cattle, sheep, or goats, among others; and wild species, such as rats, rabbits, possums, squirrels, deer, capybaras, or kangaroos, among others.

Any call of the second animal may be emitted by the audio playback device 130, including, but not limited, a distress or injury call of the second animal, a mating call of the second animal, a social call of the second animal, an aggressive or territorial call of the second animal, or a warning call of the second animal, among others.

The call of the second animal may be recorded from a living individual of the second animal species, may be simulated by a human voice, or may be synthetically generated by use of a computer or similar device.

The processor 120 may instruct the audio playback device 130 to emit the call of the second animal any number of times, such as one time or a plurality of times, in response to the triggering signal. For example, the audio playback device 130 may emit the call of the second animal a plurality of times.

In embodiments wherein the audio playback device 130 emits the call of the second animal a plurality of times, the interval between each pair of consecutive times of the plurality of times may have a fixed duration or a random duration. (As should be apparent, any pair of consecutive times inherently has an interval between them). In one embodiment, the interval between each pair of consecutive times of the plurality of times may have a random duration. The random duration may be generated by the processor 120 and/or the audio playback device 130 using random number generation algorithms known to the person of ordinary skill in the art. The random duration may be constrained by characteristics of the second animal or the first animal. For example, the random duration may be capped such that the first animal maintains interest in the emitted call of the second animal.

In embodiments wherein the audio playback device 130 emits the call of the second animal a plurality of times, a variety of different calls of the second animal may be used. For example, the audio playback device 130 may first emit an aggressive or territorial call of the second animal, which may simulate a challenge between two individuals of the second animal species, followed by a distress or injury call of the second animal, which may simulate an injury suffered in such a challenge. Other types and patterns of different calls may be used. As should be apparent, in some embodiments, the same call may be emitted a plurality of times.

The at least one sensor 110 and the audio playback device 130 may both be mounted on the same face of the audio playback device 130.

The auditory lure 100 may comprise a memory 140. The memory 140 may be a flash memory, a non-volatile memory, a RAM, an programmable ROM, or the like. Desirably, the memory 140 may be ruggedized and/or have a low power consumption, such as described above relating to other components of auditory lure 100.

The memory 140 may be configured to store the call of the second animal. The audio playback device 130 may then read the call of the second animal from the memory 140 and subsequently emit the call of the second animal.

Although FIG. 1 depicts memory 140 as a separate element from audio playback device 130, in one embodiment (not shown), the audio playback device 130 may comprise a memory dedicated to storing data, such as the call of the second animal, required for the functioning of the audio playback device 130.

Alternatively or in addition, although FIG. 1 depicts memory 140 as a separate element from processor 120, the processor 120 may be a system on a chip or a microcontroller comprising an internal memory.

The auditory lure 100 may comprise at least one audio data input 150. The audio data input 150 may be configured to receive the call of the second animal from an external source and provide the received call to the memory.

In one embodiment, the at least one audio data input 150 may be selected from an audio cable input jack (e.g., a headphone jack), a microphone input jack, a Bluetooth receiver, a WiFi receiver, a memory card reader (e.g., an SD card reader or a Mini SD card reader, among others) or a USB port (e.g., a USB port, a mini USB port, or a micro USB port, among others). The user may input the call of the second animal from a recording device, such as a recorder or a smartphone; from a microphone; or from a memory element (e.g., a memory card or a USB thumb drive), among others.

The auditory lure 100 may also comprise one or more additional components known to the person of ordinary skill in the art for use in electronic devices intended for outdoor deployment. For example, the auditory lure 100 may comprise a communications interface 160, such as an Ethernet or other wired communications interface, a WiFi and/or Bluetooth wireless communications interface, or the like, thereby enabling data transfer between the auditory lure 100 and a user device and/or remote server.

For another example, the auditory lure 100 may comprise a power supply 170. The power supply 170 may comprise a DC power source, such as one or more batteries (e.g., a 9 V battery), an AC power supply, such as may receive electrical power from an electrical utility, a generator, or the like. The power supply 170 may also comprise electrical conditioning and transforming elements, as known to the person of ordinary skill in the art. For example, the power supply 170 may comprise a 120 V power supply with a step down transformer.

The auditory lure 100 may be housed in an enclosure (not shown) of any desired size, shape, and color or pattern of colors. The enclosure may comprise a mounting device to assist in its deployment, e.g., a slot to receive a screw head, wherein the screw is partially disposed in a wooden or metallic object; an eye to receive a hook, chain link, or carabiner, such that the auditory lure 100 may be hung from a pole, tree branch, or the like.

In one particular embodiment, the auditory lure 100 may comprise the following elements. The at least one sensor 110 may be a passive infrared sensor; and the audio data input 150 may be a headphone jack or a microphone jack.

In another particular embodiment, the auditory lure 100 may comprise a 9 V lithium battery and a 5 V voltage regulator in power supply 170; the at least one sensor 110 comprises an ambient light sensor, a passive infrared sensor configured to receive data relating to the first animal's motion, and a clock providing time data; the audio playback device 130 may be configured to store and emit 10 seconds of recorded sound, and the audio playback device 130 may comprise a 0.5 W speaker; a three pole, three position main switch (TEST/OFF/ARMED), allowing recording and playback of the call (TEST), normal operation (ARMED), or cessation of operation (OFF). The auditory lure 100 of this embodiment may be housed in an enclosure having the shape of a rectangular prism of approximate dimensions 2 inches×2 inches×3.5 inches (approximately 5 cm×5 cm×9 cm).

Figure 7:
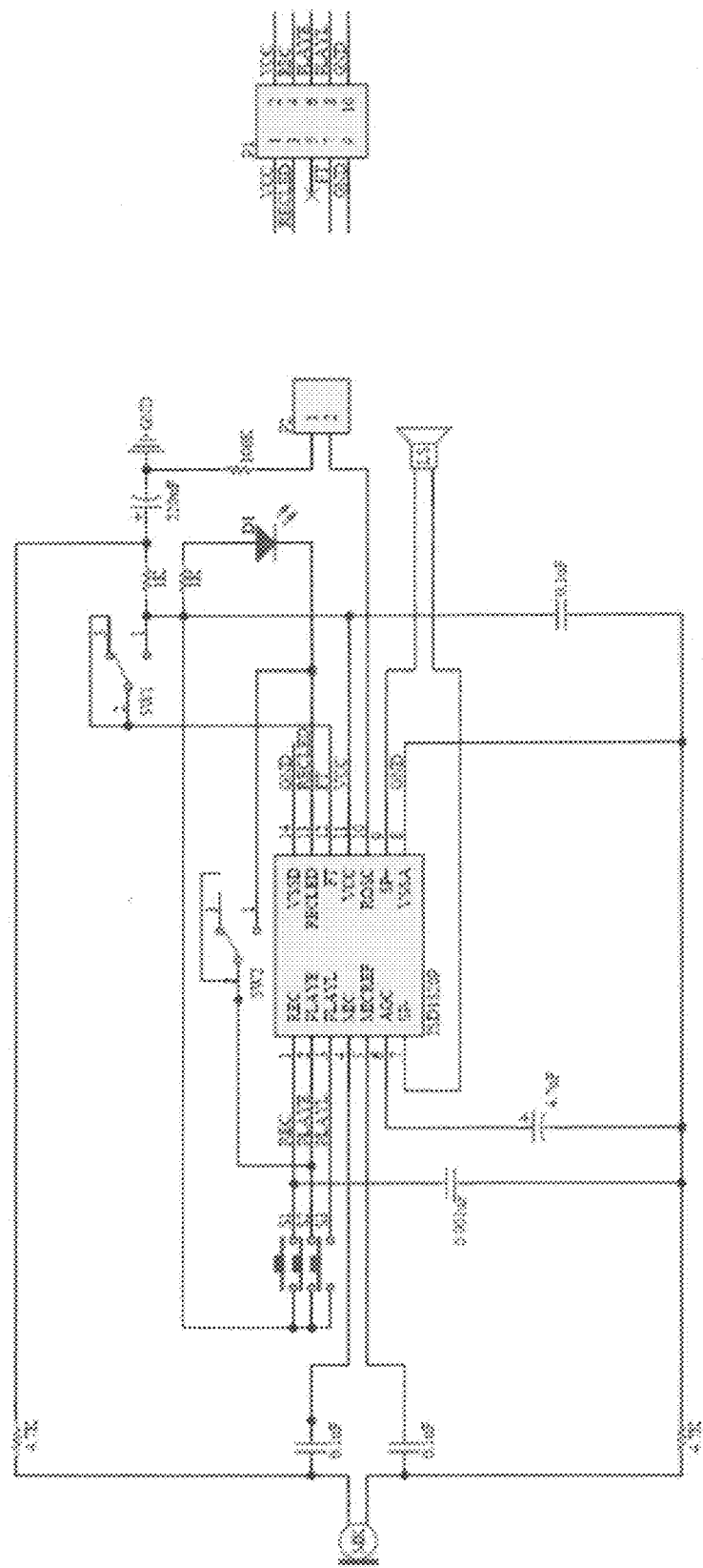
FIG. 7 depicts a sound module configured to emit a call in accordance with at least one embodiment of the present disclosure.

Various circuits which may be used in an auditory lure 100 according to this particular embodiment are shown in FIGS. 4-7, namely, a timer circuit (FIG. 4); a circuit comprising the passive infrared sensor (PIR), the ambient light sensor, the three-position main switch, and the 5 V voltage regulator (FIG. 5); a circuit comprising the 9 V lithium battery (FIG. 6); and a sound module configured to emit recorded sound (FIG. 7). The person of ordinary skill in the art will readily comprehend that FIGS. 4-7 show exemplary circuits which may be used in the one particular embodiment described in the paragraph above. Other circuits could be used in the one particular embodiment described in the paragraph above. Further, the paragraph above presents one particular embodiment of an auditory lure 100 of the present disclosure.

Figure 2A:
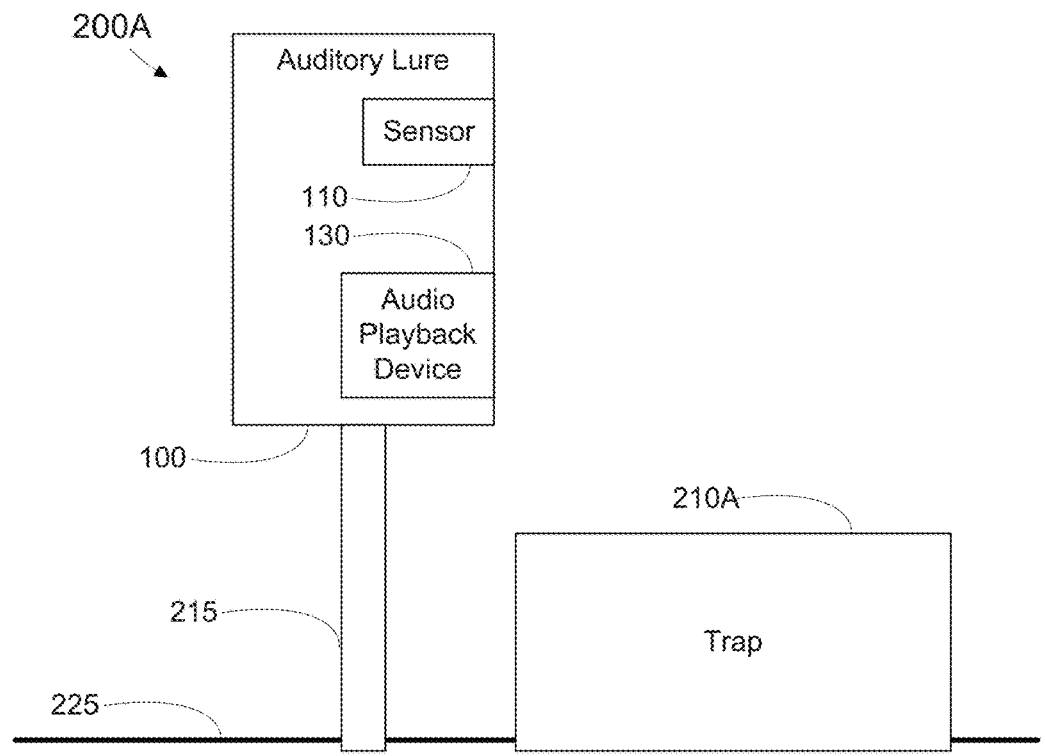
FIG. 2A depicts, in block schematic form, a first system comprising an auditory lure and a trap, in accordance with at least one embodiment of the present disclosure.

Turning to FIG. 2A, a first embodiment of a system 200A comprising an auditory lure 100 is shown. The auditory lure 100 may be as described above. For convenience, FIG. 2A and FIG. 2B only depict at least one sensor 110 and audio playback device 130. It will be understood that the auditory lure 100 shown in FIG. 2A and FIG. 2B may comprise one or more additional elements shown in FIG. 1 and/or described above.

In addition to the auditory lure 100, the system 200A may comprise a trap 210A. The trap 210A may be selected from any trap known to the person of ordinary skill in the art, having the benefit of the present disclosure and taking into consideration the first animal for which entrapment is desired (e.g., the person of ordinary skill in the art will be aware which particular trap(s) are most effective against a given first animal). In one embodiment, the trap 210A may be selected from a foothold trap, a claw trap, a snare trap, a spring snare trap, a box trap, or a body hold trap, among others. The trap 210A may be a lethal trap or a non-lethal trap.

In one embodiment, the trap 210A may be deployed without food bait. The auditory lure 100 may be sufficiently effective in luring the first animal to the trap 210A in the absence of food bait. However, if desired, the trap 210A may be deployed with food bait.

As depicted in FIG. 2A, the trap 210A may be deployed at ground level 225. Depending on the first animal, the person of ordinary skill in the art may deploy the trap 210A at an elevated location or a below-grade location (e.g., in a hole or trench), among others (not shown).

As depicted in FIG. 2A, the auditory lure 100 may be deployed in an elevated location, such as upon a pole or post 215. Pole or post 215 may be formed of wood, metal, or concrete, and the auditory lure 100 affixed thereto by a mounting device (not shown) on the auditory lure and a complementary device (not shown) on the pole or post 215.

In other embodiments, if elevation of the auditory lure 100 is desired, the pole or post 215 may be omitted and the auditory lure 100 may be deployed in or on a tree by any appropriate mounting device. For example, the auditory lure 100 may be mounted on a tree by a strap cinched around the tree and through complementary slots on the enclosure of the auditory lure 100, by hanging from a tree branch, or the like (not shown).

In still other embodiments, elevation of the auditory lure 100 may be omitted, and the auditory lure 100 may be disposed at ground level 225 or a below-grade location (e.g., in a hole or trench), among others (not shown).

Figure 2B:
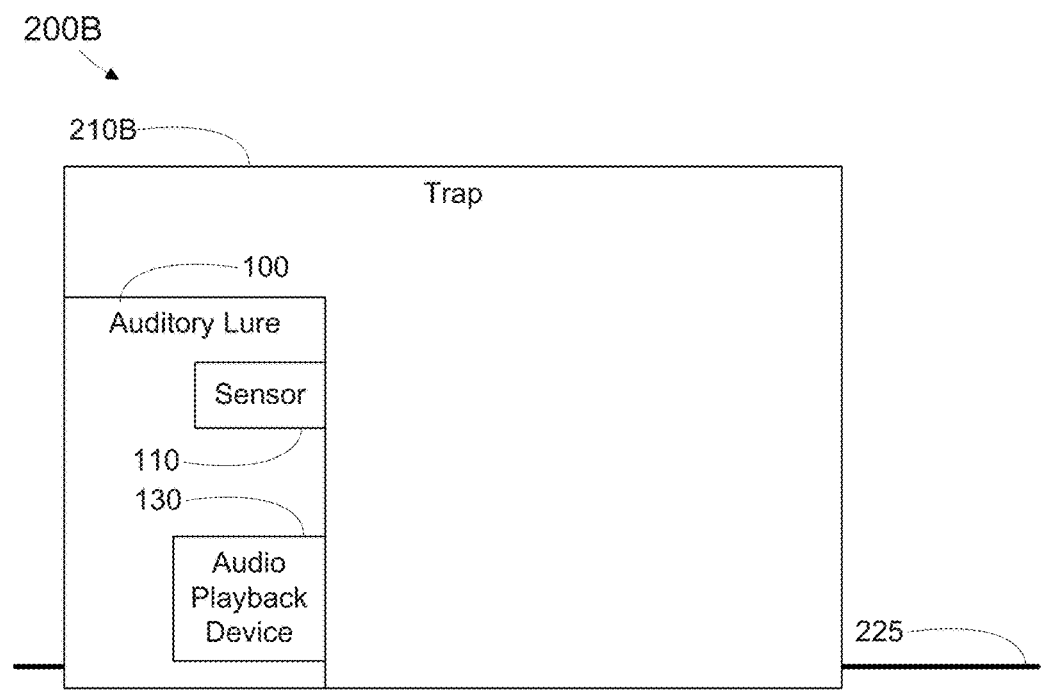
FIG. 2B depicts, in block schematic form, a second system comprising an auditory lure and a trap, in accordance with at least one embodiment of the present disclosure.

Turning now to FIG. 2B, an alternative embodiment of a system 200B comprising auditory lure 100 and trap 210B is shown. Unless described otherwise in some particular, the foregoing description of trap 210A applies to trap 210B as well.

In the system 200B depicted in FIG. 2B, the auditory lure 100 may be deployed inside the trap 210B. In some embodiments, this may render more likely entrapment of the first animal by trap 210B relative to trap 210A.

Figure 3:
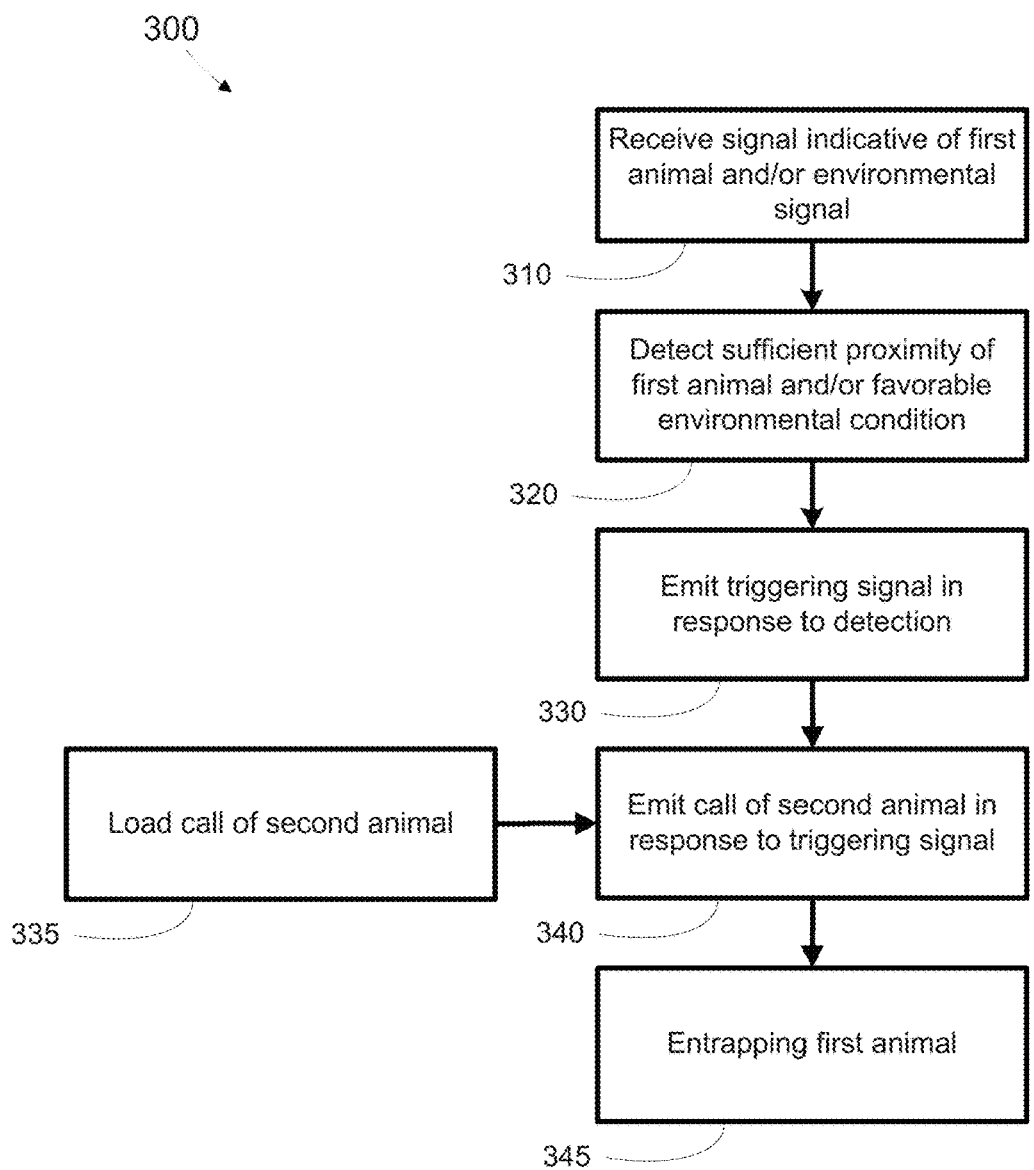
FIG. 3 depicts a flowchart of a method in accordance with at least one embodiment of the present disclosure.
Figure 4:
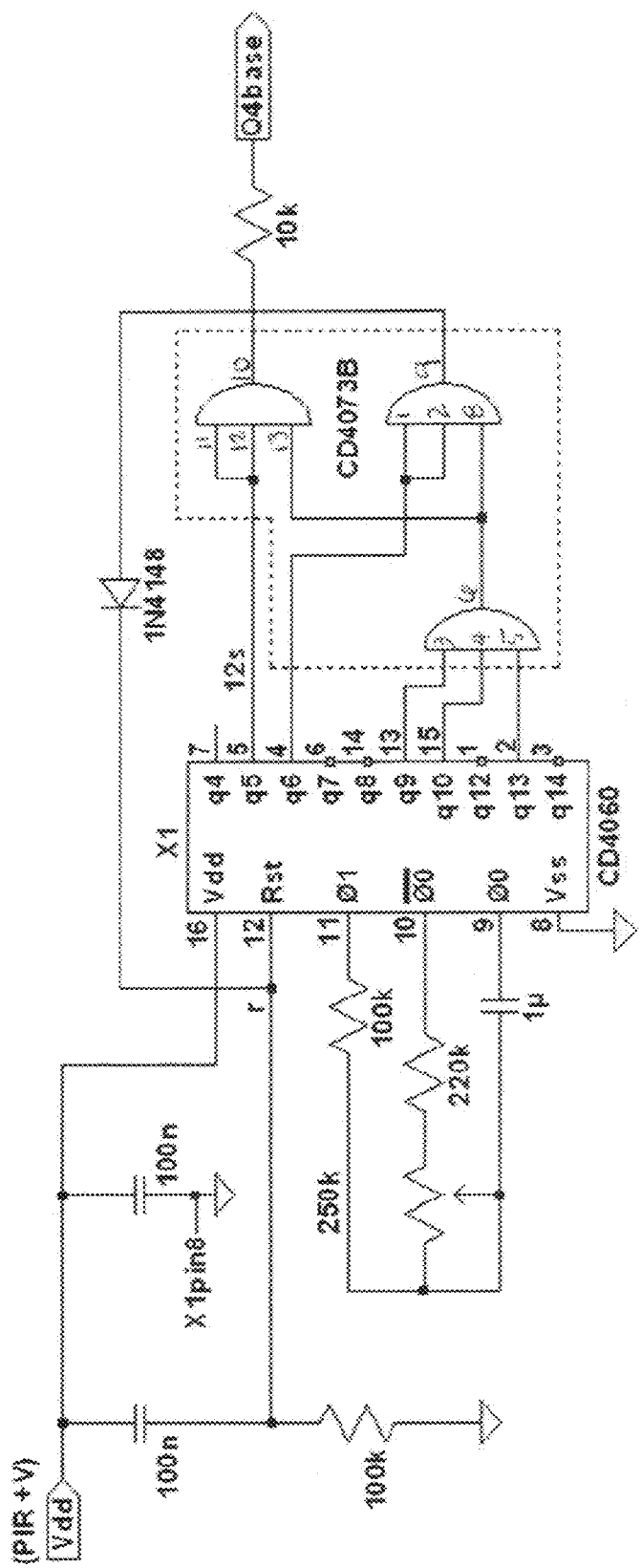
FIG. 4 depicts a timer circuit usable in at least one embodiment of the present disclosure.
Figure 5:
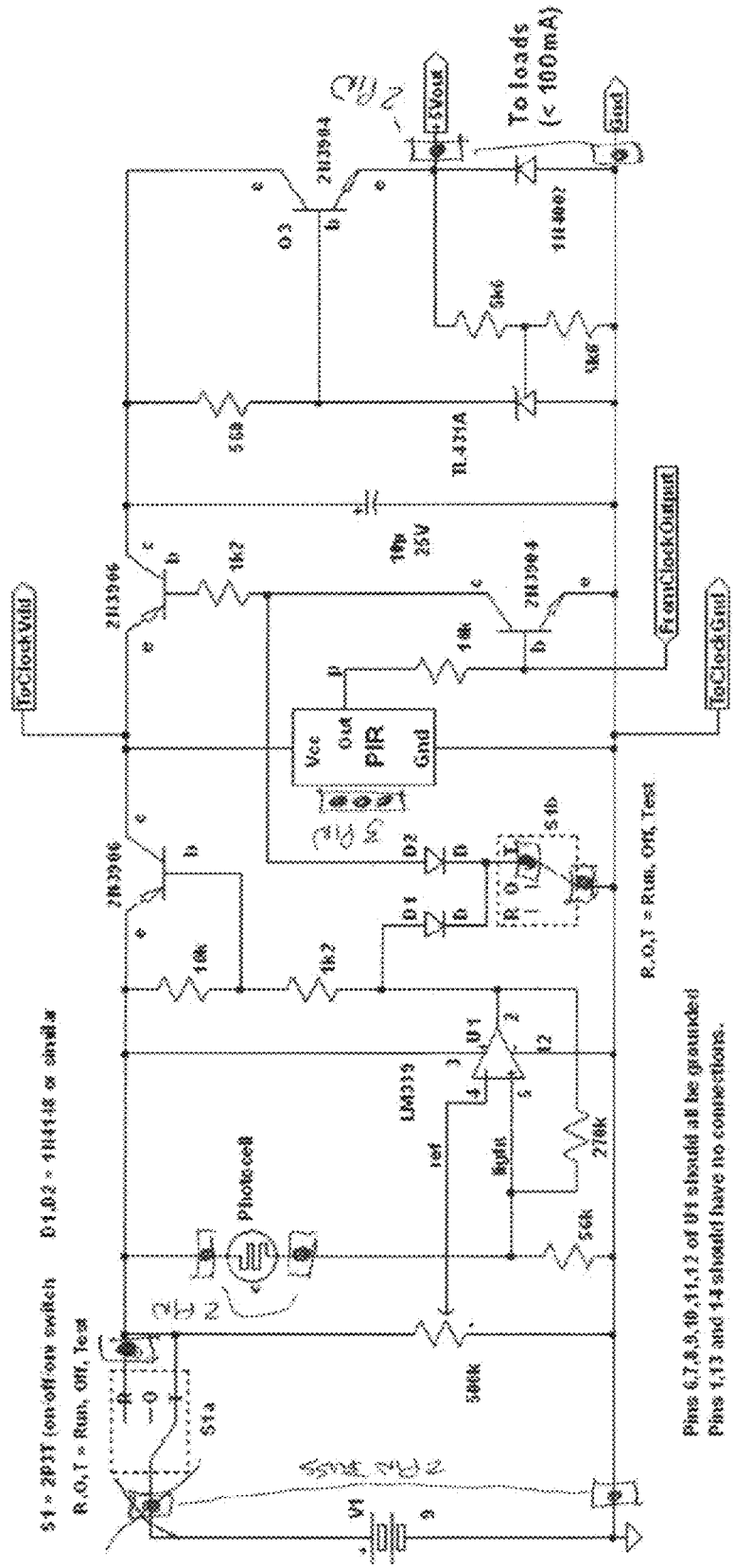
FIG. 5 depicts a first circuit usable in at least one embodiment of the present disclosure.
Figure 6:
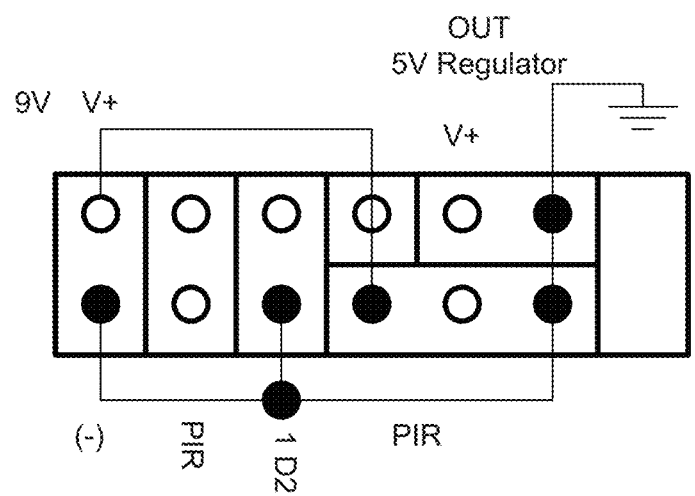
FIG. 6 depicts a second circuit usable in at least one embodiment of the present disclosure.

Turning now to FIG. 3, a flowchart of a method 300 in accordance with one or more embodiments of the present disclosure is shown. The method 200 may comprise receiving (at 310) at least one signal indicative of a first animal, at least one environmental signal, or both. The receiving (at 310) may be performed by at least one sensor 110, such as those described above. In one embodiment, the receiving (at 310) may comprise receiving at least one of the first animal's body heat, a motion of the first animal, a vocalization of the first animal, ambient light, or a time of day.

The method 300 may also comprise detecting (at 320) a sufficient proximity of the first animal, a favorable environmental condition, or both from the received signal or signals. The detecting (at 320) may be performed by a processor 120, such as a microprocessor, microcontroller, system on a chip, or other integrated circuit device, such as is described above.

The method 300 may further comprise emitting (at 330) a triggering signal in response to the detection (at 320). The emitting (at 330) may be performed by a processor 120, such as is described above.

Further, the method 300 may comprise emitting (at 340) a call of a second animal in response to the triggering signal. The emitting (at 340) may be performed by an audio playback device 130, such as is described above. In one embodiment, emitting (at 340) may comprise emitting the call of the second animal one time or a plurality of times in response to the triggering signal. In one embodiment, wherein emitting (at 340) comprises emitting the call of the second animal a plurality of times, each interval between each pair of consecutive times of the plurality of times may have a fixed duration or a random duration. For example, each interval may have a random duration.

At some time prior to emitting (at 340), the method 300 may further comprise loading (at 335) the call of the second animal into a memory. For example, the call of the second animal may be loaded into a memory 140 as described above. Loading (at 335) may be performed at any point prior to emitting (at 340), such as before receiving (at 310), detecting (at 320), or emitting (at 330). In one embodiment, loading (at 335) may be performed prior to receiving (at 310), e.g., prior to deploying an auditory lure 100.

After emitting (at 340), the method 300 may further comprise entrapping (at 345) the first animal. Entrapping (at 345) may be effected by a trap 210A or 210B, as described above.

The methods described above may be governed by instructions that are stored in a non-transitory computer readable storage medium and that are executed by, e.g., a processor in a computing device. Each of the operations described herein may correspond to instructions stored in a non-transitory computer memory or computer readable storage medium. In various embodiments, the non-transitory computer readable storage medium includes a magnetic or optical disk storage device, solid state storage devices such as flash memory, or other non-volatile memory device or devices. The computer readable instructions stored on the non-transitory computer readable storage medium may be in source code, assembly language code, object code, or other instruction format that is interpreted and/or executable by one or more processors.

EXAMPLE

An auditory lure 100 is provided, comprising a 9 V lithium battery and a 5 V voltage regulator in power supply 170; at least one sensor 110 comprising an ambient light sensor (a light dependent resistor/photo cell and a comparator circuit), a passive infrared sensor configured to receive data relating to the first animal's motion, and a clock providing time data; an audio playback device 130 configured to store and emit 10 seconds of recorded sound, and comprising a 0.5 W speaker; a 3 pole, 3 position main switch (TEST/OFF/ARMED), allowing recording and playback of a call of a second animal (TEST), normal operation (ARMED), or cessation of operation (OFF). The auditory lure 100 of this example is housed in an enclosure having the shape of a rectangular prism of approximate dimensions 2 inches×2 inches×3.5 inches (approximately 5 cm×5 cm×9 cm). The auditory lure 100 of this example comprises circuits shown in FIGS. 4-7.

The auditory lure 100 is strapped to a tree. A trap 210A is set in front of the auditory lure 100. When the auditory lure 100 is switched to the "ARMED" position, the ambient light sensor determines if it is day or night. The auditory lure 100 takes no action during the day. At dusk the auditory lure 100 turns itself ON. At sunrise the auditory lure 100 turns itself OFF.

Once the sun has set and the auditory lure 100 activates itself, the clock begins a countdown of a random time duration ranging from 15 minutes to 2 hours. Upon completion of the countdown, the auditory lure 100 emits a 10 second "teaser" call (chosen and recorded by the user) which can be heard within a radius of about 100 yards by humans, and possible a larger radius for a first animal. The objective of this "teaser" call is to get the first animal's attention and induce it to move toward the auditory lure 100 and trap 210A.

The auditory lure 100 comprises a passive infrared sensor which has approximately a 120 degree line of sight at a range of 50 feet. If the passive infrared sensor sees motion of the first animal within this range, the auditory lure 100 calls again, further enticing the first animal toward the trap. (Other animals which may happen to pass through the passive infrared sensor's observation zone would not be expected to respond to the call). The time between detection of the first animal's movement and emitting the call is adjustable, ranging from essentially zero up to 20 seconds. This may simulate various activities of a second animal, such as movement, quiet hiding, or the like.

Further calls are performed, if desired and necessary, to induce the first animal to enter the trap 210A. The trap 210A may then engage, entrapping the first animal.

The auditory lure 100 is effective without the need for food bait. The auditory lure 100 can be left unattended and unmaintained in a wild or rural area for months and will continually perform as designed.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is, therefore, evident that the particular embodiments disclosed above may be altered or modified and all such variations are considered within the scope and spirit of the invention. Accordingly, the protection sought herein is as set forth in the claims below.

What is claimed is:

1. An apparatus, comprising:
   at least one sensor configured to receive at least one signal indicative of a first animal, at least one environmental signal, or both;
   a processor configured to detect a sufficient proximity of the first animal, a favorable environmental condition, or both from the received signal or signals, and emit a triggering signal in response to the detection; and
   an audio playback device configured to receive the triggering signal and emit a call of a second animal in response to the triggering signal.

2. The apparatus of claim 1, wherein the at least one sensor is selected from a passive infrared sensor, an infrared sensor, an ultrasonic sensor, a laser, a sound-activated sensor, an ambient light sensor, or a timer.

3. The apparatus of claim 1, wherein the apparatus further comprises a memory configured to store call of the second animal and at least one audio data input configured to receive the call of the second animal.

4. The apparatus of claim 3, wherein the at least one audio data input is selected from an audio cable input jack, a microphone input jack, a Bluetooth receiver, a WiFi receiver, a memory card reader, or a USB port.

5. The apparatus of claim 1, wherein the audio playback device is configured to emit the call of the second animal a plurality of times in response to the triggering signal.

6. The apparatus of claim 5, wherein each interval between each pair of consecutive times of the plurality of times has a random duration.

7. A system, comprising:
   (i) an auditory lure, comprising:
   at least one sensor configured to receive at least one signal indicative of a first animal, at least one environmental signal, or both;
   a processor configured to detect a sufficient proximity of the first animal, a favorable environmental condition, or both from the received signal or signals, and emit a triggering signal in response to the detection; and
   an audio playback device configured to receive the triggering signal and emit a call of a second animal in response to the triggering signal; and
   (ii) a trap, wherein the trap is configured to entrap the first animal.

8. The system of claim 7, wherein the auditory lure is disposed in proximity to the trap.

9. The system of claim 7, wherein the auditory lure is disposed in the trap.

10. The system of claim 7, wherein the at least one sensor is selected from a passive infrared sensor, an infrared sensor, an ultrasonic sensor, a laser, a sound-activated sensor, an ambient light sensor, or a timer.

11. The system of claim 7, wherein the auditory lure comprises a memory configured to store the call of the second animal and at least one audio data input configured to receive the call of the second animal.

12. The system of claim 11, wherein the at least one audio data input is selected from an audio cable input jack, a microphone input jack, a Bluetooth receiver, a WiFi receiver, a memory card reader, or a USB port.

13. The system of claim 7, wherein the audio playback device is configured to emit the call of the second animal a plurality of times in response to the triggering signal.

14. The system of claim 13, wherein each interval between each pair of consecutive times of the plurality of times has a random duration.

15. A method, comprising:
   receiving, by at least one sensor, at least one signal indicative of a first animal, at least one environmental signal, or both;
   detecting, by a processor, a sufficient proximity of the first animal, a favorable environmental condition, or both from the received signal or signals;
   emitting, by the processor, a triggering signal in response to the detection; and
   emitting, by an audio playback device, a call of a second animal in response to the triggering signal.

16. The method of claim 15, wherein the receiving comprises receiving at least one of the first animal's body heat, a motion of the first animal, a vocalization of the first animal, ambient light, or a time of day.

17. The method of claim 15, further comprising:
   loading, into a memory, the call of the second animal.

18. The method of claim 15, wherein the emitting the call of the second animal comprises emitting the call of the second animal a plurality of times in response to the triggering signal.

19. The method of claim 18, wherein each interval between each pair of consecutive times of the plurality of times has a random duration.

20. The method of claim 15, further comprising:
   entrapping, by a trap, the first animal.

* * * * *